US012134055B2

(12) United States Patent
Schlichenmaier et al.

(10) Patent No.: US 12,134,055 B2
(45) Date of Patent: Nov. 5, 2024

(54) COLLECTION APPARATUS FOR RINSING MEDIA OF AN ATOMIZER

(71) Applicant: Dürr Systems AG, Bietigheim-Bissingen (DE)

(72) Inventors: Sandra Schlichenmaier, Ditzingen (DE); Thomas Buck, Sachsenheim (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 644 days.

(21) Appl. No.: 17/298,995

(22) PCT Filed: Dec. 2, 2019

(86) PCT No.: PCT/EP2019/083282
§ 371 (c)(1),
(2) Date: Jun. 2, 2021

(87) PCT Pub. No.: WO2020/114956
PCT Pub. Date: Jun. 11, 2020

(65) Prior Publication Data
US 2022/0047979 A1    Feb. 17, 2022

(30) Foreign Application Priority Data

Dec. 4, 2018 (DE) .................... 10 2018 130 809.4

(51) Int. Cl.
*B01D 46/00* (2022.01)
*B01D 46/10* (2006.01)
(Continued)

(52) U.S. Cl.
CPC ..... *B01D 46/0031* (2013.01); *B01D 46/0002* (2013.01); *B01D 46/10* (2013.01);
(Continued)

(58) Field of Classification Search
CPC ................ B01D 46/0031; B01D 46/0002; B01D 46/10; B01D 2279/55; B01D 46/003; B05B 14/00; B05B 15/55; Y02P 70/10
See application file for complete search history.

(56) References Cited

U.S. PATENT DOCUMENTS 3,016,984 A * 1/1962 Getzin ................... B01D 46/24
55/501
4,341,540 A * 7/1982 Howerin ............... A47L 7/0014
55/307
(Continued)

FOREIGN PATENT DOCUMENTS

| CN | 106000710 A | 10/2016 |
|---|---|---|
| CN | 107457127 A | 12/2017 |

(Continued)

OTHER PUBLICATIONS

Office Action from German Patent Office for related application No. DE 10 2018 130 809.4 mailed Apr. 27, 2023 (24 pages; with English machine translation).
(Continued)

*Primary Examiner* — Dung H Bui
(74) *Attorney, Agent, or Firm* — Thomas E. Bejin

(57) ABSTRACT

The disclosure relates to a collecting device for collecting fluid media (e.g. rinsing agent, paint residues), which are produced when rinsing an atomizer (e.g. rotary atomizer) in a painting plant. The collecting device according to the disclosure comprises a collecting container with an insertion opening at the top of the collecting container for inserting the atomizer into the collecting container. Furthermore, the collecting device according to the disclosure comprises a lateral container wall which externally delimits the collecting container and is substantially impermeable to paint in order to prevent paint from escaping from the collecting container. The disclosure provides that the lateral container
(Continued)

Figure 1:
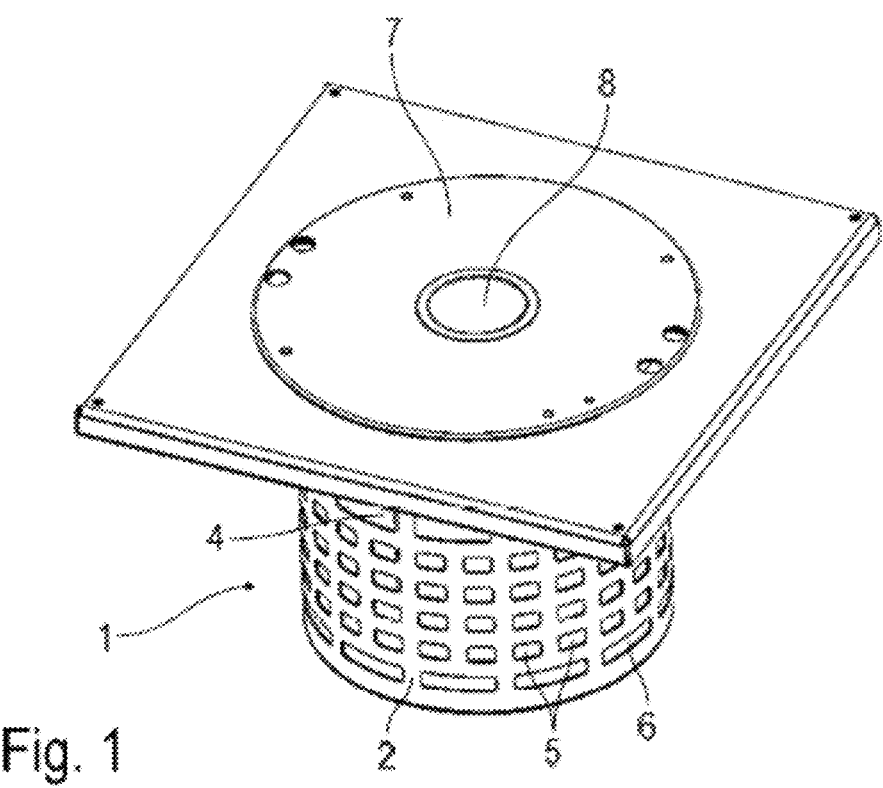

wall of the collecting container is at least partially air-permeable so that moist air can escape from the interior of the collecting container to the outside.

21 Claims, 2 Drawing Sheets

(51) Int. Cl.
*B05B 14/00* (2018.01)
*B05B 15/55* (2018.01)
(52) U.S. Cl.
CPC ............ *B05B 14/00* (2018.02); *B05B 15/55* (2018.02); *B01D 2279/55* (2013.01)

(56) References Cited

U.S. PATENT DOCUMENTS

| | | | | |
|---|---|---|---|---|
| 4,349,360 A * | 9/1982 | Schuurmans | ......... | B01D 47/06 55/424 |
| 4,827,955 A | 5/1989 | Stern | | |
| 5,183,066 A | 2/1993 | Hethcoat | | |
| 5,316,588 A | 5/1994 | Dyla | | |
| 7,799,235 B2 * | 9/2010 | Olson | ................... | B01D 29/52 210/232 |
| 2003/0177906 A1 * | 9/2003 | Jones | ..................... | B01D 50/20 55/486 |
| 2009/0145841 A1 * | 6/2009 | Arai | ..................... | B01D 29/33 210/497.3 |
| 2012/0042912 A1 | 2/2012 | Saint | | |
| 2012/0168361 A1 * | 7/2012 | Motakef | ................ | B01D 50/20 210/314 |
| 2014/0059984 A1 * | 3/2014 | Iwasaki | ............. | F02M 21/0218 55/418 |
| 2014/0075695 A1 | 3/2014 | Kleiner et al. | | |
| 2014/0096683 A1 * | 4/2014 | Azwell | .................. | B01D 46/30 55/327 |
| 2014/0318088 A1 * | 10/2014 | Bizzarro | ................... | B04C 5/06 55/450 |
| 2015/0040537 A1 * | 2/2015 | Hicks | ............... | B01F 25/43151 60/273 |
| 2015/0251120 A1 * | 9/2015 | Jakop | ................. | B01D 46/0005 55/496 |
| 2017/0128867 A1 * | 5/2017 | Vining | .................. | B01D 50/20 |
| 2018/0169544 A1 * | 6/2018 | Roddy | .................... | H04N 5/77 |
| 2019/0078472 A1 * | 3/2019 | Tan | ......................... | F01D 25/32 |

FOREIGN PATENT DOCUMENTS

| | | |
|---|---|---|
| CN | 108144801 A | 6/2018 |
| EP | 0742052 A2 | 11/1996 |
| EP | 1338347 A2 | 8/2003 |
| EP | 1346777 A2 | 9/2003 |
| EP | 1367302 A2 | 12/2003 |
| KR | 20140008828 A | 1/2014 |
| KR | 20180108921 A | 10/2018 |

OTHER PUBLICATIONS

International Search Report and Written Opinion for PCT/EP2019/083282 mailed Mar. 3, 2020 (12 pages; with English translation).
German Patent and Trademark Office—Office Action for Application No. 10 2018 130 809.4 mailed Jul. 25, 2019 (3 pages).
China National Intellectual Property Administration Office Action and Search Report for Application No. CN201980080408.5 mailed Jul. 5, 2022 (12 pages; with English translation).
Korean Patent Office Notice of Office Action for related application No. KR10-2021-7020836 mailed Mar. 26, 2024 (24 pages; with English machine translation).

* cited by examiner

COLLECTION APPARATUS FOR RINSING MEDIA OF AN ATOMIZER

CROSS-REFERENCE TO RELATED APPLICATIONS

This application is a national stage of, and claims priority to, Patent Cooperation Treaty Application No. PCT/EP2019/083282, filed on Dec. 2, 2019, which application claims priority to German Application No. 10 2018 130 809.4, filed on Dec. 4, 2018, which applications are hereby incorporated herein by reference in their entireties. CL FIELD The disclosure relates to a collecting device for collecting fluid media (e.g. rinsing agent, paint residues), which accumulate during cleaning (e.g. short rinsing, color change rinsing) of an atomizer (e.g. rotary atomizer) in a painting plant. Furthermore, the disclosure comprises a corresponding operating method.

BACKGROUND

In modern painting plants for the painting of motor vehicle body components, rotary atomizers are usually used for paint application, which emit a spray jet of the paint to be applied. During a color change and during interruptions of operation, for example during the night or during the weekend, these rotary atomizers are rinsed inside and cleaned outside to avoid paint deposits and contamination by residual paint. The internal channels of the rotary atomizer are usually rinsed with a rinsing agent to remove the paint remaining in the rotary atomizer. In the past, these rinsing processes of the rotary atomizers went into the so-called wet scrubbing under the painting booth. However, since the introduction of dry rinsing, this is no longer possible, so that separate collecting devices (e.g. hoppers) are used for this purpose. In some cases, devices that are used for external cleaning of the atomizer and are described in EP 1 367 302 A2, for example, are used to collect the media of the rinsing processes. For a cleaning or rinsing process, the rotary atomizer to be cleaned is introduced into the cleaning device by a painting robot and then cleaned in the cleaning device.

This well-known technology, e.g. with hoppers for collecting the rinsing media, is however associated with various disadvantages. If two-component material (2K material) is flushed from the atomizer into the hopper, it must be prevented from hardening in the hopper. To do this, the hopper must be supplied with solvent (for example a thinner), which is expensive in terms of energy. In addition, the subsequent treatment of the residues of paint and solvent also generates high costs. In order to keep energy consumption low, the solvent is clocked from the paint mixing chamber to keep the hoppers free, which requires complex communication with the robot controller. Furthermore, there is a risk of clogging of the hoppers, for example by too much lubricant, cloths, rags, waste, etc. Finally, the well-known cleaning devices in the paint booth lead to emissions of volatile organic compounds (VOC).

If the rinsing processes are carried out in a cleaning device for cleaning the outer surface of the atomizer, there is a risk that moving parts or components with openings (e.g. nozzles) may become clogged when rinsing 2-component material and the cleaning function of the device is no longer given.

For the state of the art, reference is also made to US 2012/0042912 A1.

Finally, EP 1 346 777 A1 discloses a measuring device that is designed according to the preamble of claim 1 and also allows for the cleaning of an atomizer. An outlet is arranged on the underside of the collecting container, which is closed by a flap during a cleaning process and is opened after a cleaning process so that coating agent residues can escape into the outlet. A disadvantage here is the fact that the outlet pipe must be flushed.

BRIEF DESCRIPTION OF THE DRAWINGS

FIG. 1 a perspective view of a collecting device according to the disclosure from an inclined position, FIG. 2 a perspective view of the collecting device in FIG. 1 from an oblique angle from below, and FIG. 3 is a perspective section of the fall-arrest device from FIGS. 1 and 2.

DETAILED DESCRIPTION

The disclosure is based on the technical-physical discovery that with the known cleaning devices and collecting devices, moist, turbulent air is generated inside the collecting device during the rinsing process, which can settle on the atomizer housing in the form of moisture. However, this moisture on the atomizer housing leads to increased soiling of the outer shell of the atomizer during painting. In addition, the moisture on the outer shell of the atomizer can cause high-voltage interference with the electrostatic charging of the coating material. Finally, the moisture on the outer shell of the atomizer can also lead to defect patterns on the painted surface. The disclosure therefore also aims at preventing this moist, turbulent air in the collecting device.

The collecting device according to the disclosure first of all has, in accordance with the collecting devices (e.g. hopper) described above, a largely closed collecting container which preferably has an insertion opening on its upper side through which the atomizer can be inserted into the collecting container for a rinsing process. The lateral container wall of the collecting container limits the collecting container to the outside and is essentially impermeable to paint in order to prevent paint from escaping from the collecting container during a rinsing process.

The collecting device according to the disclosure differs from the known collecting device described above (e.g. with a hopper) in that the lateral container wall of the collecting container is at least partially permeable to air so that moist air can escape from the interior of the collecting container to the outside. This advantageously prevents moisture from settling on the outer shell of the atomizer to be cleaned during a rinsing process, since such moisture is associated with the problems described above.

In a preferred embodiment of the disclosure, the air permeability of the container wall is achieved by numerous air outlet openings in the container wall so that the moist air from the interior of the collecting container can escape to the outside through the air outlet openings.

For example, the number of air outlet openings can be larger than 10, 20 or 50 to achieve sufficient air permeability.

Preferably, the total cross-section of the air outlet openings is at least 5%, 10%, 20%, 30%, 40%, 50%, 60% or 70% of the total wall area of the container wall to achieve sufficient air permeability of the container wall.

An advantage of the collecting container is that it has no media supply lines, which means that no software control is necessary and retrofitting can be carried out without additional valves or tubing.

In a preferred embodiment of the disclosure, the cross-section of the individual air outlet openings is not uniform, i.e. the individual air outlet openings have different cross-sections. Preferably, the cross-section of the air outlet openings is largest near the insertion opening of the collecting container (i.e. at the top) and then decreases in one or more steps in the direction of insertion (i.e. downwards) to reach a minimum in the central area. The cross-section of the air outlet openings then increases again towards the bottom of the collecting container, preferably in a single step. The air outlet openings can thus have, for example, four different cross-sections. It should be mentioned here that the cross-section of the individual air outlet openings preferably only varies along the direction of insertion, whereas the cross-section of the individual air outlet openings in the circumferential direction of the collecting container is preferably uniform.

It should also be mentioned that the air outlet openings form a certain flow resistance and thereby reduce the outlet velocity of the air flowing out through the air outlet opening. This is particularly advantageous if the container wall has a flat paint filter which retains the paint in the paint filter and thus prevents the paint from escaping from the collecting container to the outside. The outlet velocity of the air flowing out of the collecting container through the air outlet openings is therefore preferably less than 5 m/s, 4 m/s, 3 m/s, 2 m/s or even less than 1 m/s. In the preferred embodiment of the disclosure, the outlet velocity of the outflowing air is in the range of 0.05 m/s to 2 m/s, whereby a value of essentially 0.5 m/s has proven to be advantageous.

It has already been briefly mentioned above that the container wall usually has a flat paint filter in order to prevent paint from escaping from the interior of the collecting container to the outside despite the air permeability of the container wall. Preferably, this paint filter is located on the inside of the container wall, however, it is also possible that the paint filter is located on the outside of the container wall.

In the preferred embodiment of the disclosure, the paint filter is a filter mat covering the container wall, whereby such filter mats are known per se from the state of the art and therefore need not be described in detail.

However, it should be mentioned that the paint filter (e.g. filter mats) should cover the air outlet openings completely in order to avoid a disturbing paint leakage.

It should also be mentioned that the paint filter (e.g. filter mats) is preferably replaceable. This makes sense because the paint filter becomes increasingly clogged with the collected paint during operation, so that the paint filter (e.g. filter mats) should be replaced in good time before it becomes completely clogged.

It should also be mentioned that the paint filter can absorb the paint with a certain quantitative absorption capacity, i.e. the paint filter can absorb a certain amount of paint until the paint filter is clogged. Preferably, this quantitative absorption capacity of the paint filter is much greater than the amount of paint produced during a rinsing process, in particular by a factor of 2, 3, 4, 5, 10, 20 or 50 to over 1000. This is useful so that the paint filter does not have to be replaced often.

It should also be mentioned that the paint filter (e.g. filter mats) preferably extends over the entire lateral and lower container wall.

According to the disclosure, the collecting container has an outlet which is preferably located at the bottom of the collecting container and serves to drain off paint residues and/or rinsing agent.

Since the majority of the paint is collected in the paint filter (e.g. filter mats), only very strongly diluted paint material passes through the outlet into the return system. This has the advantage that the recirculation does not have to be flushed, as the paint material is so diluted that it does not stick in the pipes. This saves a great deal of energy and material for the supply and preparation of diluent.

It should also be mentioned that the usual rotary atomizers usually have a negative pressure area in the area between the rotating bell plate and the shaping air ring. During a rinsing process, this negative pressure area can cause moist air to be drawn out of the collecting container and onto the atomizer surface, which is undesirable. The atomizer to be flushed is therefore preferably introduced into the collecting container so far that the negative pressure area of the atomizer is within the collecting container during a cleaning process. This prevents the negative pressure area between the bell plate and the shaping air ring from causing moist air to escape from the collecting container. The collecting container should therefore preferably have a sufficient immersion depth to allow the atomizer to be flushed in.

Because of the negative pressure area between the rotating bell plate and the shaping air ring of the rotary atomizer described above, it should also be possible for ambient air to flow into the collecting container during a flushing process. The inlet opening of the collecting container is therefore preferably considerably larger than the outer diameter of the atomizer housing ("tube") at the front end so that ambient air can flow into the collecting container through the annular gap remaining between them. The inside diameter of the inlet opening of the collecting container is therefore preferably larger than 150%, 200%, 250% or 300% of the frontal outside diameter of the atomizer housing.

It should also be mentioned that the collecting container should have a sufficiently large internal volume. Thus, a certain amount of air is produced during a flushing process, as, for example, air is released from the atomizer's shaping air nozzles. The internal volume of the collecting container should therefore be at least one third and/or at most twice the amount of cleaning air produced during a cleaning process. In the preferred embodiment of the disclosure, the internal volume of the collecting container is substantially two-thirds of the amount of air generated during a single flushing operation. In case of different possible flushing processes with different parameters, this adjustment is preferably made with respect to the flushing process with the largest air volume.

It should also be mentioned that the diameter and the height of the collecting container according to the disclosure are preferably essentially the same.

During operation, the collecting container is usually closed at its top by a cover, with the insertion opening located in the cover. This cover can be either flat, concave or convex when viewed from the outside and is designed to prevent VOCs from escaping from the collecting container.

However, the disclosure does not only claim protection for the collecting device described above. Rather, the disclosure also claims protection for a corresponding operating method. The details of the operating method according to the disclosure are essentially already apparent from the above description of the collecting device according to the disclosure, so that a complete separate description of the operating method according to the disclosure is not necessary.

However, it should be mentioned that there is a risk of sparking during operation of an atomizer with an electrostatic coating charging. The atomizer to be flushed with the electrostatic coating agent charging may therefore only be introduced into the collecting container when the electrostatic coating agent charging is switched off, i.e. when the atomizer is de-energized. It should be mentioned here that the atomizer is usually introduced into the collecting container by a painting robot, whereby the painting robot is controlled by a robot control. The disclosure now preferably provides that the robot control defines a restricted area around the collecting container when the coating agent charge is switched on, so that the atomizer cannot be introduced into the collecting container when the coating agent charge is switched on, in order to avoid a sparkover.

The disclosure is particularly advantageous for the collection of the flushing media of atomizers (e.g. rotation atomizers) that apply two-component paints. However, the disclosure is also suitable for collecting the rinsing media of atomizers that apply one-component paints.

Figure 2:
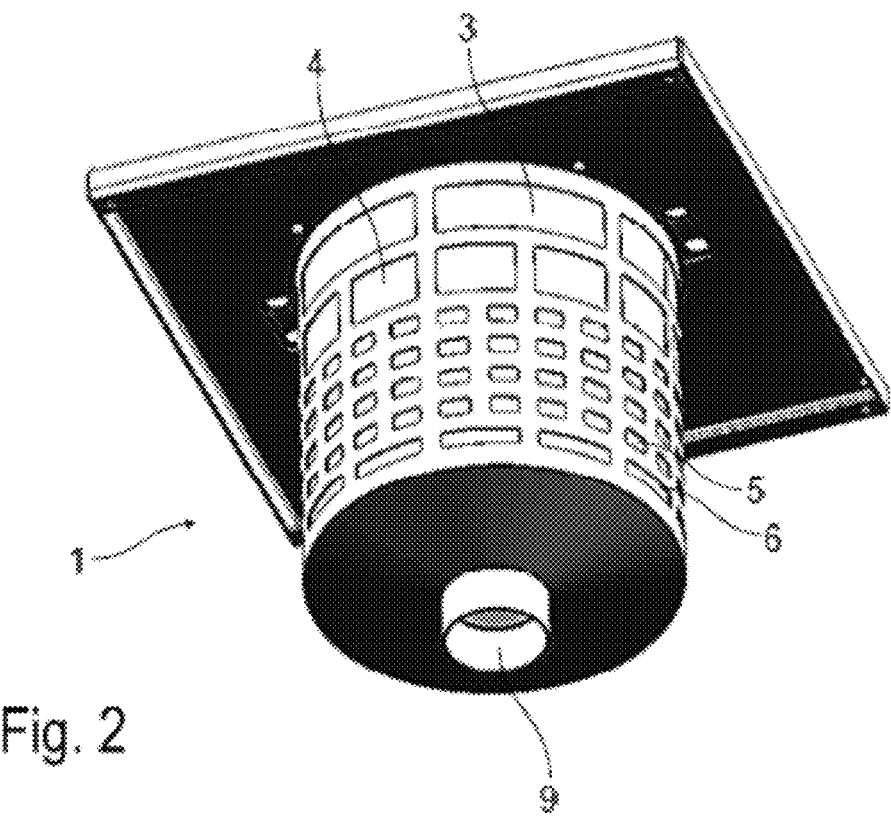
Figure 3:
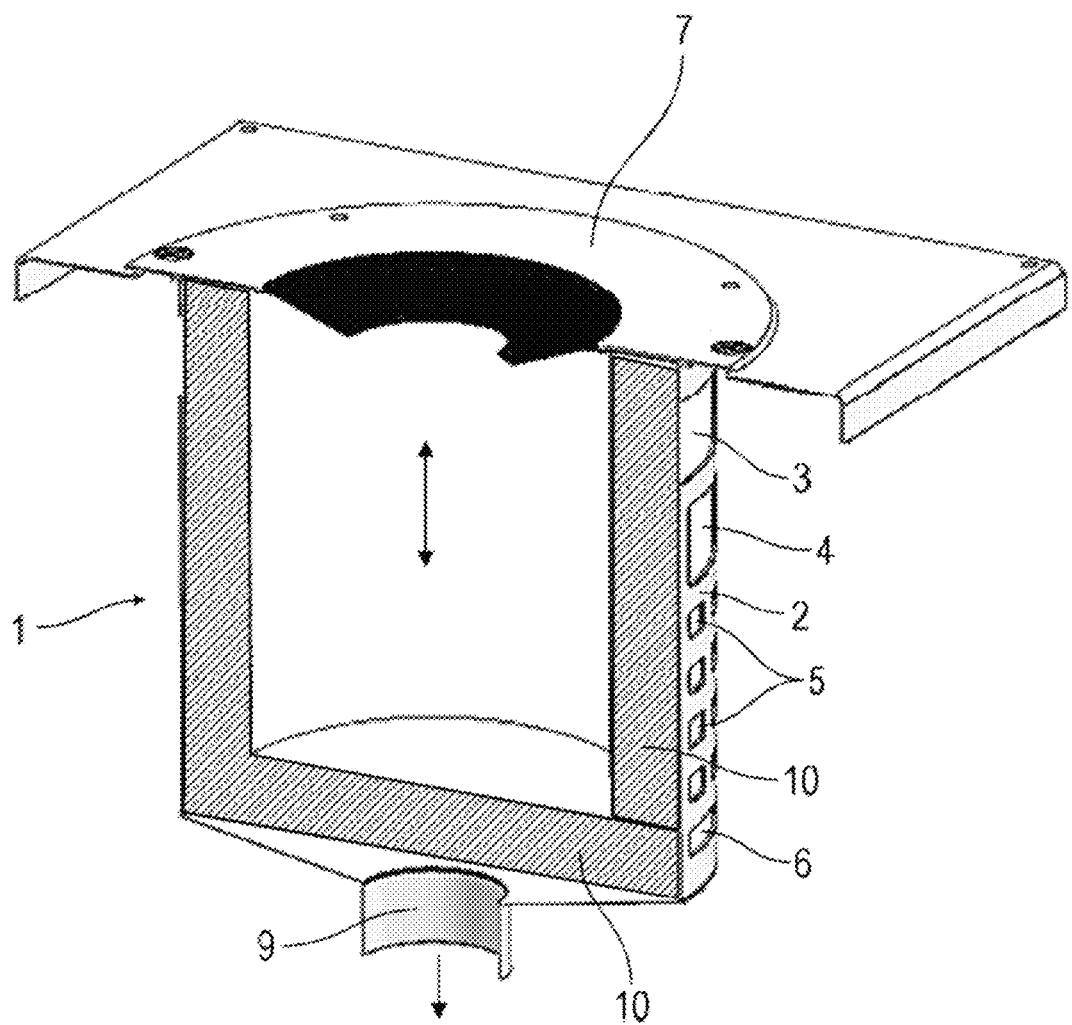

In the following, a preferred embodiment of a collecting device according to the disclosure is described, as shown in FIGS. 1 to 3.

The collecting device according to the disclosure serves to collect the rinsing media of a rotary atomizer used in a painting plant for painting body parts of motor vehicles. The collecting device according to the disclosure is therefore preferably arranged inside a painting booth, e.g. on the floor of the painting booth, preferably at floor level.

The collecting device initially has a pot-shaped collecting container 1, which is cylindrically shaped. The collecting container 1 is limited on the outside by a container wall 2, which is impermeable to paint and air and is usually made of steel. However, in the container wall 2 of the collecting container 1 there are numerous air outlet openings 3-6 to allow moist air to escape from the inside of the collecting container 1 to the outside, as described in detail below.

The collecting container 1 is closed on its upper side with a cover 7, whereby in the cover 7 there is an insertion opening 8 for the insertion of a rotary atomizer. In this embodiment, the cover 7 is concave at the peripheral edge of the insertion opening 8 when viewed from outside, as shown in FIG. 3. Alternatively, it is also possible that the cover 7 is convex or flat when viewed from the outside.

The collecting container 1 has an outlet 9 on its underside, which is connected to a return line in order to be able to drain paint and solvent residues into the return line.

On the inside of the container wall 2, the container wall 2 is covered with filter mats 10 which prevent paint from the inside of the collecting container 1 from escaping to the outside through the air outlet openings 3-6. The filter mats 10 therefore collect a large part of the paint produced during operation. This is also advantageous because only small residual quantities of paint have to be removed through the outlet 9, so that the recirculation does not have to be flushed, since the paint material is diluted in the recirculation so that it does not stick in the pipes. This saves enormous amounts of energy and material for the supply and preparation of paint thinner.

It should also be mentioned that the cross-section of the individual air outlets 3-6 is not uniformly constant. Rather, the cross-section of the individual air outlets 3-6 varies along the direction of insertion, which is shown in FIG. 3 by a double arrow. For example, the air outlets 3 at the top of the collecting container 1 have the largest cross-section. The cross section of the air outlet openings 4 following along the direction of insertion is then still approximately half as large. The following air outlet openings 5 then have a cross section which corresponds to only about a quarter of the cross section of the air outlet openings 4. Along the direction of insertion, the air outlets 6 follow, which again have a larger cross section that is approximately twice as large as the cross section of the air outlets 5. The cross section of the air outlets 3-6 decreases in the direction of insertion starting from the insertion opening 8 and then reaches a minimum at the air outlets 5, only to increase again. This design of the cross-section of the air outlets 3-6 has proven to be advantageous during operation for reasons of flow dynamics.

It should also be mentioned that the filter mats 10 completely cover the container wall in the area of the air outlet openings 3-6 to prevent paint from escaping. In addition, the filter mats 10 preferably also cover the bottom of the collecting container 1, so that paint can only enter the outlet 9 after passing the filter mats 10.

The invention claimed is:

1. A collecting device for collecting fluid media which arise when rinsing an atomizer in a painting installation, with
   a) a collecting container having a top and a bottom,
   b) an insertion opening at the top of the collecting container, the insert opening for inserting the atomizer into the collecting container, and
   c) a lateral container wall which externally bounds the collecting container in order to prevent paint from escaping from the collecting container, the lateral container wall of the collecting container being at least partially permeable to air in order to allow moist air to escape from the interior of the collecting container to the outside,
   d) an outlet at the bottom to drain at least one of the paint and rinsing agent from the collecting container, and
   e) a paint filter in the container wall adapted for retaining the paint and thereby preventing the paint from escaping from the collecting container to the outside,
   f) wherein the paint filter is arranged in the flow path between the insertion opening and the outlet, so that the paint filter must be passed through when flowing into the outlet.

2. A collecting device according to claim 1, wherein the lateral container wall of the collecting container has numerous air outlet openings, wherein the moist air can escape from the interior of the collecting container to the outside through the air outlet openings.

3. A collecting device according to claim 2, wherein
   a) the air outlet openings together have a certain total cross-section,
   b) the container wall has a certain wall area,
   c) the total cross-section of the air outlet openings is at least 5% of the total wall area of the container wall.

4. A collecting device according to claim 2, wherein
   a) the cross-section of the individual air outlet openings varies along the direction of insertion from a large cross-section of a first of the individual air outlet openings near the insertion opening, to a minimum cross-section of a second of the individual air outlet openings in a central area between the insertion opening and the bottom, to a larger cross-section of a third of the individual air outlet openings near the bottom.

5. A collecting device according to claim 2, wherein the cross-section of the individual air outlet openings is uniform in the circumferential direction.

6. A collecting device according to claim 2, wherein
   a) the air outlet openings form a certain flow resistance and thereby reduce the outlet velocity of the air flowing out through the air outlet openings, and
   b) the outlet velocity of the air flowing out of the collecting container through the air outlet openings is less than 5 m/s.

7. A collecting device according to claim 1, wherein the paint filter is flat.

8. A collecting device according to claim 7, wherein the flat paint filter is arranged on an inside of the container wall.

9. A collecting device according to claim 8, wherein the paint filter has at least one filter mat which covers the container wall on the inside of the container wall.

10. A collecting device according to claim 7, wherein the paint filter completely covers the air outlet openings.

11. A collecting device according to claim 7, wherein the paint filter is replaceable.

12. A collecting device according to claim 7, wherein the paint filter can absorb the paint with a certain quantitative absorption capacity, the quantitative absorption capacity of the paint filter being greater than the paint quantity produced during a rinsing process.

13. A collecting device according to claim 7, wherein the paint filter extends over the entire lateral container wall and the entire outlet so that paint can only enter the outlet after passing the paint filter.

14. A collecting device according to claim 1, wherein a) the collecting container has a certain maximum immersion depth up to which the atomizer can be introduced into the collecting container through the insertion opening, b) the atomizer has a negative pressure area between the bell plate and the shaping air ring, and c) the maximum immersion depth is such that the negative pressure area of the atomizer is inside the collecting container during a rinsing process.

15. A collecting device according to claim 1, wherein a) the insertion opening of the collecting container has a certain inner diameter, b) the atomizer has an atomizer housing with a certain front-side outer diameter, c) the inner diameter of the insertion opening of the collecting container is larger than the front-side outer diameter of the atomizer housing, so that ambient air can flow from outside into the collecting container to the negative pressure area, and d) the inner diameter of the insertion opening of the collecting container is larger than 150% of the frontal outer diameter of the atomizer housing.

16. A collecting device according to claim 1, wherein a) the atomizer includes shaping air nozzles and a certain amount of purge air is produced during a rinsing process from shaping air nozzles of the atomizer and from incoming ambient air, b) the collecting container has a certain internal volume, c) the internal volume of the collecting container is at least ⅓ the amount of purge air.

17. A collecting device according to claim 1, wherein the collecting container has a certain diameter and a certain height, wherein the diameter is equal to the height.

18. A collecting device according to claim 1, wherein the collecting container is closed at its top by a cover which is flat, concave or convex in shape when viewed from the outside.

19. A collecting device according to claim 18, wherein the cover is flat in shape when viewed from the outside.

20. A collecting device according to claim 18, wherein the cover is concave in shape when viewed from the outside.

21. A collecting device according to claim 18, wherein the cover is convex in shape when viewed from the outside.

* * * * *